US012653215B2

(12) United States Patent
Pires

(10) Patent No.: US 12,653,215 B2
(45) Date of Patent: Jun. 16, 2026

(54) PLANT-BASED EGG SUBSTITUTE

(71) Applicant: Cargill, Incorporated, Wayzata, MN (US)

(72) Inventor: Marilia Kubota Pires, Sorocaba (BR)

(73) Assignee: Cargill, Incorporated, Wayzata, MN (US)

( * ) Notice: Subject to any disclaimer, the term of this patent is extended or adjusted under 35 U.S.C. 154(b) by 604 days.

(21) Appl. No.: 18/006,517

(22) PCT Filed: Jul. 14, 2021

(86) PCT No.: PCT/US2021/041550
§ 371 (c)(1),
(2) Date: Jan. 23, 2023

(87) PCT Pub. No.: WO2022/020149
PCT Pub. Date: Jan. 27, 2022

(65) Prior Publication Data
US 2023/0345981 A1    Nov. 2, 2023

Related U.S. Application Data

(60) Provisional application No. 63/055,509, filed on Jul. 23, 2020.

(51) Int. Cl.
*A23L 15/00* (2026.01)
*A23J 3/14* (2006.01)
*A23L 29/262* (2016.01)
*A23L 29/269* (2016.01)

(52) U.S. Cl.
CPC ................ *A23L 15/35* (2016.08); *A23J 3/14* (2013.01); *A23L 29/262* (2016.08); *A23L 29/272* (2016.08)

(58) Field of Classification Search
CPC ...... A23L 15/35; A23L 29/262; A23L 29/272; A23J 3/14; A23V 2002/00; A23V 2200/122; A23V 2250/156; A23V 2250/1582; A23V 2250/5054; A23V 2250/51088; A23V 2250/548
USPC ........................................................ 426/656
See application file for complete search history.

(56) References Cited

U.S. PATENT DOCUMENTS

| | | | | |
|---|---|---|---|---|
| 2006/0088574 A1* | 4/2006 | Manning | ................. | A23L 33/16 |
| | | | | 424/439 |
| 2007/0275127 A1* | 11/2007 | Ball | ......................... | A23B 5/08 |
| | | | | 426/582 |
| 2017/0020167 A1* | 1/2017 | Keys | ..................... | A23L 29/262 |

FOREIGN PATENT DOCUMENTS

| | | | | |
|---|---|---|---|---|
| CA | 27496381 A | 2/2013 | | |
| CA | 3100185 A1 | 11/2019 | | |
| EP | 3216354 A1 | 9/2017 | | |
| KR | 20140085685 A * | 7/2014 | ............. | A21D 8/047 |
| WO | WO-2017143301 A1 * | 8/2017 | ............... | A23L 2/66 |

* cited by examiner

*Primary Examiner* — Erik Kashnikow
*Assistant Examiner* — Bhaskar Mukhopadhyay

(57) ABSTRACT

Disclosed herein are egg substitutes based on plant protein. In an aspect, the egg substitute composition includes pea protein. In an aspect, the egg substitute composition is egg-free. In an aspect, the composition is free of soy protein and/or wheat protein. Functional systems for providing the appropriate texture for a plant-based egg substitute composition are also disclosed.

20 Claims, 3 Drawing Sheets

PLANT-BASED EGG SUBSTITUTE

CROSS REFERENCE TO RELATED APPLICATIONS

This application is a national phase application of PCT Application No. PCT/US2021/041550, filed Jul. 14, 2021, which claims the benefit of U.S. Provisional Application No. 63/055,509, filed Jul. 23, 2020, and entitled "PLANT-BASED EGG SUBSTITUTE," each of which is incorporated by reference herein in its entirety.

BACKGROUND

Eggs are a common foundational food in many cultures. However, there is currently an increased interest in plant-based diets and/or substituting plant-based analogues for foods produced from animals. Accordingly, there is a need for plant-based compositions that can be used as a substitute for real eggs.

SUMMARY

The present disclosure relates to a plant-based egg substitute composition. In an aspect, the composition includes a protein content that is the same or similar to the protein content of natural eggs while providing a texture upon cooking that is also similar to natural eggs.

In an aspect, the egg substitute composition is a composition comprising: 45 to 80% plant protein on a dry weight basis, 10 to 20% texturizer on a dry weight basis, 1 to 10% chloride salt on a dry weight basis, 1 to 10% gelling agent on a dry weight basis, and water, wherein the water is from 75 to 95% of the total egg substitute composition. In an aspect, the egg substitute composition is a dry powder egg substitute composition, comprising: 45 to 80% plant protein on a dry weight basis, 10 to 20% methylcellulose on a dry weight basis, 1 to 10% chloride salt on a dry weight basis, and 1 to 10% gelling agent on a dry weight basis.

In an aspect, the egg substitute composition is a composition comprising: 70 to 90% plant protein on a dry weight basis and 10 to 30% texturizer on a dry weight basis. In an aspect, the egg substitute composition is a composition consisting of: 70 to 90% plant protein on a dry weight basis; 10 to 30% texturizer on a dry weight basis, one or more coloring agents, and one or more flavoring agents.

In an aspect, the composition further comprises a coloring agent. In an aspect, the plant protein comprises a pea protein ingredient. In an aspect, the plant protein comprises pea protein isolate. In an aspect, the plant protein consists of a pea protein ingredient. In an aspect, the plant protein consists of pea protein isolate. In an aspect, the plant protein comprises a rice protein ingredient. In an aspect, the amount of plant protein is from 45 to 70% on a dry weight basis.

In an aspect, the texturizer comprises methylcellulose. In an aspect, the gelling agent comprises methylcellulose. In an aspect, the texturizer and gelling agent consists of methylcellulose. In an aspect, the amount of methylcellulose is from 7 to 20% on a dry weight basis. In an aspect, the gelling agent comprises a gellan gum. In an aspect, the gelling agent comprises a high acyl gellan gum. In an aspect, the gelling agent comprises agar. In an aspect, the gelling agent comprises agar and carrageenan. In an aspect, the amount of gelling agent is from 1 to 20% on a dry weight basis. In an aspect, the coloring agent comprises curcumin extract. In an aspect, the amount of coloring agent is from 0.1 to 2% on a dry weight basis. In an aspect, the chloride salt comprises sodium chloride, potassium chloride, or a mixture thereof. In an aspect, the amount of chloride salt is from 0.1 to 10% on a dry weight basis.

In an aspect, the composition further comprises a low acyl gellan gum. In an aspect, the amount of low acyl gellan gum is from 0.1 to 5%.

In an aspect, the composition is egg-free. In an aspect, the composition is free of soy protein and wheat protein.

Methods for making an egg substitute composition are also described. In an aspect, the method for making an egg substitute food product, comprises: providing the egg substitute composition of any of the aspects described above, adjusting the amount of water in the egg substitute composition to 75 to 95%, and cooking the egg substitute composition to provide an egg substitute food product, wherein the egg substitute food product is a scrambled egg or omelet.

BRIEF DESCRIPTION OF THE FIGURES

The drawings illustrate generally, by way of example, but not by way of limitation, various embodiments discussed in the present document.

DETAILED DESCRIPTION

Figures 1A, 1B, 1C, 1D:
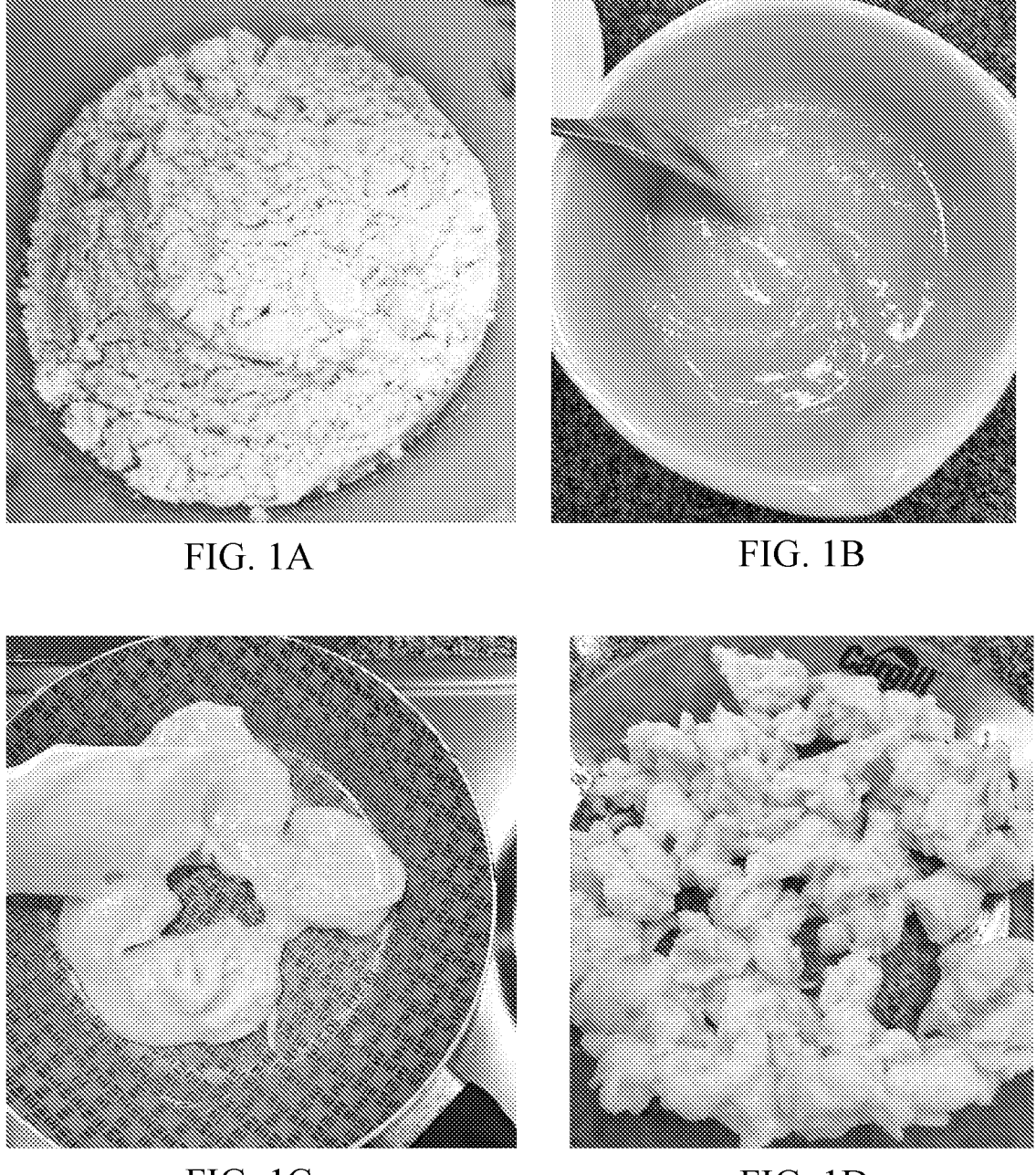
FIG. 1 is series of images showing the conversion of an egg substitute composition to an egg substitute food product. The egg substitute composition is provided in powder form (A), then dispersed in water (B), then cooked in a skillet (C), to provide a final egg substitute food product (D).

Disclosed herein are egg substitutes based on plant protein. In an aspect, the egg substitute composition includes pea protein. In an aspect, the egg substitute composition is egg-free. As described herein, the egg substitute compositions have a high protein content and have a similar taste and texture to real eggs after cooking.

Unless defined otherwise, all technical and scientific terms used herein have the same meaning as commonly understood by one skilled in the art to which this invention belongs. As used herein, each of the following terms has the meaning associated with it as defined below.

As used herein, "eggs" refers primarily to chicken eggs, but can include any type of avian egg. The term "eggs" primarily refers to whole eggs, but can also refer to liquid eggs, egg whites, egg yolks, or any combination thereof.

As used herein, "egg-free," "free of egg," "free of egg protein," and the like refer to a composition that is substantially free of avian egg or avian egg protein(s), i.e., containing no detectable amounts of avian egg protein.

As used herein, "plant protein ingredient" refers to a composition sourced from plants that contains a significant amount of plant protein and is useful for the egg substitute compositions herein. As would be understood by a person skilled in the art, a plant protein ingredient generally contains other components aside from protein, such as starch and/or other carbohydrates, fat, and fiber. Preferred plant protein ingredients are ingredients sourced from plants that are enriched in protein, i.e., have a higher protein content than is typically found in the natural plant source. It is to be understood that this definition applies to specific plant protein ingredients such pea protein ingredient, rice protein ingredient, etc.

In an aspect, the egg substitute composition has a protein content that is similar to or greater than the typical protein content of chicken eggs. For example, the egg substitute composition can have a protein content of at least 40%, at least 45%, at least 47%, at least 50%, at least 52%, at least 55%, at least 57%, at least 60%, at least 62%, at least 65%, at least 67%, at least 70% or at least 75% protein on a dry weight basis. The egg substitute composition can have a protein content (dry weight basis) in the range of 40 to 95%, 45 to 95%, 45 to 90%, 45 to 85%, 45 to 80%, 45 to 75%, 45 to 70%, 45 to 65%, 45 to 60%, 45 to 55%, 47 to 60%, 47 to 57%, 47 to 55%, 50 to 95%, 50 to 90%, 50 to 85%, 50 to 80%, 50 to 75%, 50 to 70%, 50 to 65%, 50 to 60%, 52 to 60%, 52 to 57%, 55 to 90%, 55 to 85%, 55 to 80%, 55 to 75%, 55 to 70%, 55 to 65%, or 55 to 60%.

In an aspect, the protein in the egg substitute composition is a protein sourced from plants or is derived from plant protein. In an aspect, the protein can be from two or more different plants rather than a single source. In an aspect, the plant protein in the egg substitute composition is a complete protein, i.e., it contains all essential amino acids. In an aspect, the plant protein is from an ingredient that is a plant protein isolate. In an aspect, the plant protein is from an ingredient that is a plant protein concentrate. In an aspect, the plant protein is from an ingredient that is a plant flour. In an aspect, at least a portion of the protein in the egg substitute composition is pea protein. In an aspect, the protein in the egg substitute composition contains only pea protein, i.e., is substantially free of any other type of protein. Other examples of plant protein sources useful for the egg substitute composition include, but are not limited to: mung bean, fava bean, black bean, soy, chickpea, rice, lentil, water lentil, and other legumes or pulses.

In an aspect, the protein in the egg substitute composition is a modified plant protein. In an aspect, the modified plant protein is a hydrolyzed plant protein. In an aspect, the modified plant protein is a hydrolyzed pea protein. In an aspect, the protein in the egg substitute composition is a mixture of hydrolyzed plant protein and unmodified plant protein.

In an aspect, the egg substitute composition is substantially free of plant protein allergens. Accordingly, in an aspect, the egg substitute composition is substantially free of wheat protein, soy protein, and/or corn protein.

Pea protein is a plant protein that is preferred for the egg substitute composition described herein. In an aspect, the pea protein ingredient used in the egg substitute composition can have a protein content of at least 75%, 76%, 77%, 78%, 79%, or 80%. In an aspect, the pea protein is gluten-free and soy-free. An exemplary pea protein for use in the egg substitute composition is PURIS' Pea Protein 870, which is a pea protein isolate described as having at least 80% pea protein on a dry basis, with the primary remaining components being carbohydrates, fat, and fiber. Other compositions containing pea protein can be used in the egg substitute composition, such as pea flour or concentrated pea protein having from 40% to 70% protein content on a dry basis.

In addition to plant protein, the egg substitute composition includes other ingredients. In an aspect, the egg substitute composition includes a functional system for providing the appropriate texture, i.e., a texture that is similar to real chicken eggs after cooking. In an aspect, the functional system includes one or more texturizers, one or more gelling agents, and salt. The functional system can also include additional ingredients.

In an aspect, the egg substitute composition contains one or more texturizers. In an aspect, the texturizer is methylcellulose or includes methylcellulose.

In an aspect, the egg substitute composition contains one or more gelling agents. In an aspect, the gelling agent is a hydrocolloid. In an aspect, the gelling agent is a gellan gum. In an aspect, the gellan gum is a high acyl gellan gum. In an aspect, the gellan gum is a low acyl gellan gum. In an aspect, the gellan gum is a mixture of low acyl and high acyl gellan gums. Other gelling agents useful for the egg substitute composition include but are not limited to: agar and carrageenan.

In an aspect, the gelling agent is methylcellulose. In such an aspect, methylcellulose can be used alone as the gelling agent, i.e., the gelling agent consists of methylcellulose. Using methylcellulose as both the texturizer and gelling agent can provide an egg substitute with a reduced ingredient list compared to other egg substitutes, which can be very desirable to certain consumers.

In an aspect, the egg substitute composition contains salt. In an aspect, the salt is a chloride salt. In an aspect, the salt is sodium chloride, potassium chloride, or a mixture thereof.

In an aspect, the functional system of the egg substitute composition is a functional system that can make the egg substitute composition coagulate during cooking in a manner similar to real eggs, while also providing an egg-like chewy and elastic texture. In an aspect, the functional system can be mixed with any plant protein ingredient (along with water, optionally coloring agent(s) and optionally flavoring agent(s)) to produce a complete egg substitute composition. In an aspect, the functional system is a functional system for a plant-based egg substitute comprising: 10 to 20% methylcellulose, 1 to 10% gelling agent, and 1 to 10% chloride salt as a percentage of the total egg substitute composition on a dry weight basis. In an aspect, the functional system comprises 10 to 20% methylcellulose, 1 to 10% high acyl gellan gum, and 1 to 10% chloride salt as a percentage of the total egg substitute composition on a dry weight basis. In an aspect, the functional system comprises 0.1 to 50.0% gelling agent and 1 to 10% chloride salt as a percentage of the total egg substitute composition on a dry weight basis. In such an aspect, the gelling agent can be methylcellulose.

In an aspect, the egg substitute composition also includes one or more coloring agents and/or flavoring agents. Non-limiting examples of coloring and/or flavoring agents useful for the egg substitute composition include: curcumin extract; annatto extract; turmeric extract; saffron extract; yeast extract; natural, artificial, and natural identical flavors; monosodium glutamate; and combinations thereof. In an aspect, the coloring agent consists of a curcumin extract (e.g., Shade Spicy Shado Powder from GNT).

In an aspect, the egg substitute composition can be used as a substitute for egg whites. Accordingly, in an aspect, the egg substitute composition can be made and used without a coloring agent, or the egg substitute composition can be made with bleached, colorless, and/or otherwise color-modified ingredients such that the egg substitute composition mimics a natural egg white color and appearance.

In an aspect, the egg substitute composition can be used as a substitute for egg yolk. Accordingly, in an aspect, the egg substitute composition can be made with an increased amount of coloring agent (compared to an egg substitute used as a whole egg substitute) and/or made with color-modified ingredients such that the egg substitute composition mimics a natural egg yolk color and appearance.

In an aspect, the egg substitute composition is particularly useful for making a substitute for scrambled eggs or omelet-style eggs. The egg substitute composition described herein provides a texture after cooking that is comparable to scrambled-style or omelet-style eggs made with real eggs, i.e., a texture after cooking that is chewy and elastic like real eggs at either warm or cold temperature. In an aspect, the present disclosure also relates to a method for making an egg substitute food product, including the steps of: providing an egg substitute composition (as described herein), adjusting the amount of water in the egg substitute composition to 75 to 95%, and cooking the egg substitute composition to provide an egg substitute food product, wherein the egg substitute food product is a scrambled egg or omelet.

In an aspect, a dry powder egg substitute composition as described herein can be used to make an egg substitute food product. By way of example, a single portion of natural chicken egg has about 6.2 g of protein. A single portion of an egg substitute food product can be made by combining a dry powder egg substitute composition as described herein with the appropriate amount of water. For example, by mixing ~11.5 of the dry ingredients described in Tables 1 or 2 below with ~100 mL water, an egg substitute food product having ~6.2 g protein can be provided.

A further advantage of the egg substitute composition described herein is the reduced number of ingredients compared to other egg substitute compositions. Many consumers are currently demanding food products with the fewest number of ingredients possible, sometimes referred to as "clean label." In an aspect, the egg substitute composition has less than 10 ingredients other than water; less than 9 ingredients other than water; less than 8 ingredients other than water; less than 7 ingredients other than water; less than 6 ingredients other than water; or less than 5 ingredients other than water. In an aspect, the egg substitute composition has only 3 ingredients other than water and flavoring/coloring agents. In an aspect, the egg substitute composition has only 4 ingredients other than water and flavoring/coloring agents.

EXAMPLES

The invention is further described in detail by reference to the following experimental examples. These examples are provided for purposes of illustration only, and are not intended to be limiting unless otherwise specified. Thus, the invention should in no way be construed as being limited to the following examples, but rather should be construed to encompass any and all variations which become evident as a result of the teaching provided herein.

Example 1: Egg Substitute Composition for Scrambled or Omelet-Style Eggs

Figure 2A:
FIG. 2 is a set of images showing an egg substitute composition after cooking to produce a scrambled-style egg substitute food product (A) and an omelet-style egg substitute food product (B).
Figure 2B:

An egg substitute composition is prepared according to the ingredient composition list in Table 1. In this example, the dry ingredients (all ingredients except water) are mixed to form an egg substitute powder (FIG. 1A). The total amount of dry ingredients is 11.5 g. The dry ingredients are then mixed with 100 mL cold water (i.e., water at less than XX ° C.) to form the final composition specified in Table 1. The 11.5 g dry powder egg substitute composition mixed with 100 mL water represents a typical individual portion, i.e., a portion corresponding to a single chicken egg. The dry ingredient powder is easily dispersed in the water (FIG. 1B). The well-mixed egg substitute composition is then added to a preheated and slightly greased skillet for cooking (FIG. 1C). After approximately 2 minutes of cooking time, with stirring, a scrambled-egg style egg substitute food product is provided (FIG. 1D and FIG. 2A). Alternatively, the egg substitute composition can be cooked using a technique for making an omelet known in the art, instead of stirring as in the scrambled-egg style food product, to produce an omelet-style egg substitute food product (FIG. 2B). Both the scrambled-style and omelet-style egg substitute food products produced using Egg Substitute Composition #1 have a texture and color similar to real chicken eggs, while also providing similar protein content (~50% of the final food product, or ~6 g protein).

TABLE 1

| Egg Substitute Composition #1 | |
| --- | --- |
| Ingredient | % |
| VIVAPUR MC A 4* (Methylcellulose) | 1.8 |
| Viscogum ATL 205** (High Acyl Gellan Gum) | 0.6 |
| Kelcogel F** (Low Acyl Gellan Gum) | 0.3 |
| Sodium Chloride | 0.5 |
| Potassium Chloride | 0.2 |
| Shade Spicy Shado Powder*** (Curcumin Extract) | 0.09 |
| Puris ™ Pea 870 | 6.80 |
| Water | q.s.p. |
| Total | 100.0 |

*from JRS Rettenmeier
**from CP Kelco
***from GNT

Example 2: Egg Substitute Composition for Scrambled or Omelet-Style Eggs

Figure 3A:
FIG. 3 is a set of images showing another egg substitute composition after cooking to produce a scrambled-style egg substitute food product (A) and an omelet-style egg substitute food product (B).
Figure 3B:

An egg substitute composition is prepared according to the ingredient composition list in Table 2. The same procedure is followed for Example 1. The dry ingredients (all ingredients except water) are mixed to form an egg substitute powder. The total amount of dry ingredients is 10.9 g. The dry ingredients are then mixed with 100 mL cold water (i.e., water at less than XX ° C.) to form the final composition specified in Table 2. The 10.9 g dry powder egg substitute composition mixed with 100 mL water represents a typical individual portion. The dry ingredient powder is easily dispersed in the water. The well-mixed egg substitute composition is then added to a preheated and slightly greased skillet for cooking. After approximately 2 minutes of cooking time, with stirring, a scrambled-egg style egg substitute food product is provided (FIG. 3A). Alternatively, the egg substitute composition can be cooked using a technique for making an omelet known in the art, instead of stirring as in the scrambled-egg style food product, to produce an omelet-style egg substitute food product (FIG. 3B). Both the scrambled-style and omelet-style egg substitute food products produced using Egg Substitute Composition #2 have a texture and color similar to real chicken eggs, while also providing similar protein content (~50% of the final food product).

TABLE 2

| Egg Substitute Composition #2 | |
| --- | --- |
| Ingredient | % |
| VIVAPUR MC A 4 (Methylcellulose) | 1.8 |
| Viscogum ATL 205 (High Acyl Gellan Gum) | 0.6 |
| Sodium Chloride | 0.5 |

TABLE 2-continued

| Egg Substitute Composition #2 | |
| --- | --- |
| Ingredient | % |
| Shade Spicy Shado Powder (Curcumin Extract) | 0.09 |
| Puris ™ Pea 870 | 6.80 |
| Water | q.s.p. |
| Total | 100.0 |

ADDITIONAL EXAMPLES

The following are non-limiting examples of the invention.

Example 1. An egg substitute composition, comprising: 45 to 80% plant protein on a dry weight basis, 10 to 20% texturizer on a dry weight basis, 1 to 10% chloride salt on a dry weight basis, 1 to 10% gelling agent on a dry weight basis, and water, wherein the water is from 75 to 95% of the total egg substitute composition.

2. A dry powder egg substitute composition, comprising: 45 to 80% plant protein on a dry weight basis, 10 to 20% methylcellulose on a dry weight basis, 1 to 10% chloride salt on a dry weight basis, and 1 to 10% gelling agent on a dry weight basis.

3. The composition of any of the preceding examples, further comprising a coloring agent.

4. The composition of any of the preceding examples, wherein the plant protein comprises a pea protein ingredient.

5. The composition of any of the preceding examples, wherein the plant protein comprises pea protein isolate.

6. The composition of any of the preceding examples, wherein the plant protein comprises a rice protein ingredient.

7. The composition of any of the preceding examples, wherein the amount of plant protein is from 45 to 70% on a dry weight basis.

8. The composition of any of the preceding examples, wherein the texturizer comprises methylcellulose.

9. The composition of any of the preceding examples, wherein the gelling agent comprises methylcellulose.

10. The composition of any of the preceding examples, wherein the texturizer and gelling agent consists of methylcellulose.

11. The composition of any of the preceding examples, wherein the amount of methylcellulose is from 7 to 20% on a dry weight basis.

12. The composition of any of the preceding examples, wherein the gelling agent comprises a gellan gum.

13. The composition of any of the preceding examples, wherein the gelling agent comprises a high acyl gellan gum.

14. The composition of any of the preceding examples, wherein the gelling agent comprises agar.

15. The composition of any of the preceding examples, wherein the gelling agent comprises agar and carrageenan.

16. The composition of any of the preceding examples, wherein the amount of gelling agent is from 1 to 20% on a dry weight basis.

17. The composition of any of the preceding examples, wherein the coloring agent comprises curcumin extract.

18. The composition of any of the preceding examples, wherein the amount of coloring agent is from 0.1 to 2% on a dry weight basis.

19. The composition of any of the preceding examples, wherein the chloride salt comprises sodium chloride, potassium chloride, or a mixture thereof.

20. The composition of any of the preceding examples, wherein the amount of chloride salt is from 0.1 to 10% on a dry weight basis.

21. The composition of any of the preceding examples, further comprising a low acyl gellan gum.

22. The composition of any of the preceding examples, wherein the amount of low acyl gellan gum is from 0.1 to 5%.

23. The composition of any of the preceding examples, wherein the composition is egg-free.

24. The composition of any of the preceding examples, wherein the composition is free of soy protein and wheat protein.

25. A method for making an egg substitute food product, comprising: providing the egg substitute composition of any of the preceding examples, adjusting the amount of water in the egg substitute composition to 75 to 95%, and cooking the egg substitute composition to provide an egg substitute food product, wherein the egg substitute food product is a scrambled egg or omelet.

The invention claimed is:

1. An egg substitute composition, comprising:
60% to 80% plant protein on a dry weight basis;
7% to 20% methylcellulose as texturizer on a dry weight basis;
0.1% to 10% chloride salt on a dry weight basis;
1% to 20% gellan gum as gelling agent on a dry weight basis; and
75% to 95% water.

2. The composition of claim 1, wherein the plant protein comprises a pea protein ingredient.

3. The composition of claim 1, wherein the plant protein comprises a rice protein ingredient.

4. The composition of claim 1, wherein the amount of plant protein is 65% to 70% on a dry weight basis.

5. The composition of claim 1, wherein the gellan gum comprises a high acyl gellan gum.

6. The composition of claim 1, further comprising a coloring agent in an amount from 0.1% to 2% on a dry weight basis.

7. The composition of claim 1, wherein the gellan gum comprises a low acyl gellan gum.

8. The composition of claim 7, wherein the amount of low acyl gellan gum is from 0.1% to 5%, on a dry weight basis.

9. The composition of claim 1, wherein the composition is egg-free.

10. The composition of claim 1, wherein the composition is free of soy protein and wheat protein.

11. A dry powder egg substitute composition, comprising:
60% to 80% plant protein on a dry weight basis;
7% to 20% methylcellulose as texturizer on a dry weight basis;
0.1% to 10% chloride salt on a dry weight basis;
1% to 20% gellan gum as gelling agent on a dry weight basis.

12. The composition of claim 11, wherein the plant protein comprises a pea protein ingredient or a rice protein ingredient.

13. The composition of claim 11, wherein the amount of plant protein is 65% to 70% on a dry weight basis.

14. The composition of claim 11, wherein the gelling agent comprises a high acyl gellan gum.

15. The composition of claim 11, wherein the composition is egg-free.

16. The composition of claim 11, wherein the composition is free of soy protein and wheat protein.

17. The composition of claim 1, wherein mass ratio of methylcellulose to gellan gum is from 2:1 to 3:1.

18. The composition of claim 11, wherein mass ratio of methylcellulose to gellan gum is from 2:1 to 3:1.

19. The composition of claim 1, wherein the gellan gum comprises 1% to 10% high acyl gellan gum and 0.1% to 5% low acyl gellan gum, by weight of the egg substitute composition.

20. The composition of claim 11, wherein the gellan gum comprises 1% to 10% high acyl gellan gum and 0.1% to 5% low acyl gellan gum, by weight of the dry powder egg substitute composition.

\* \* \* \* \*